United States Patent Office 3,407,658
Patented Oct. 29, 1968

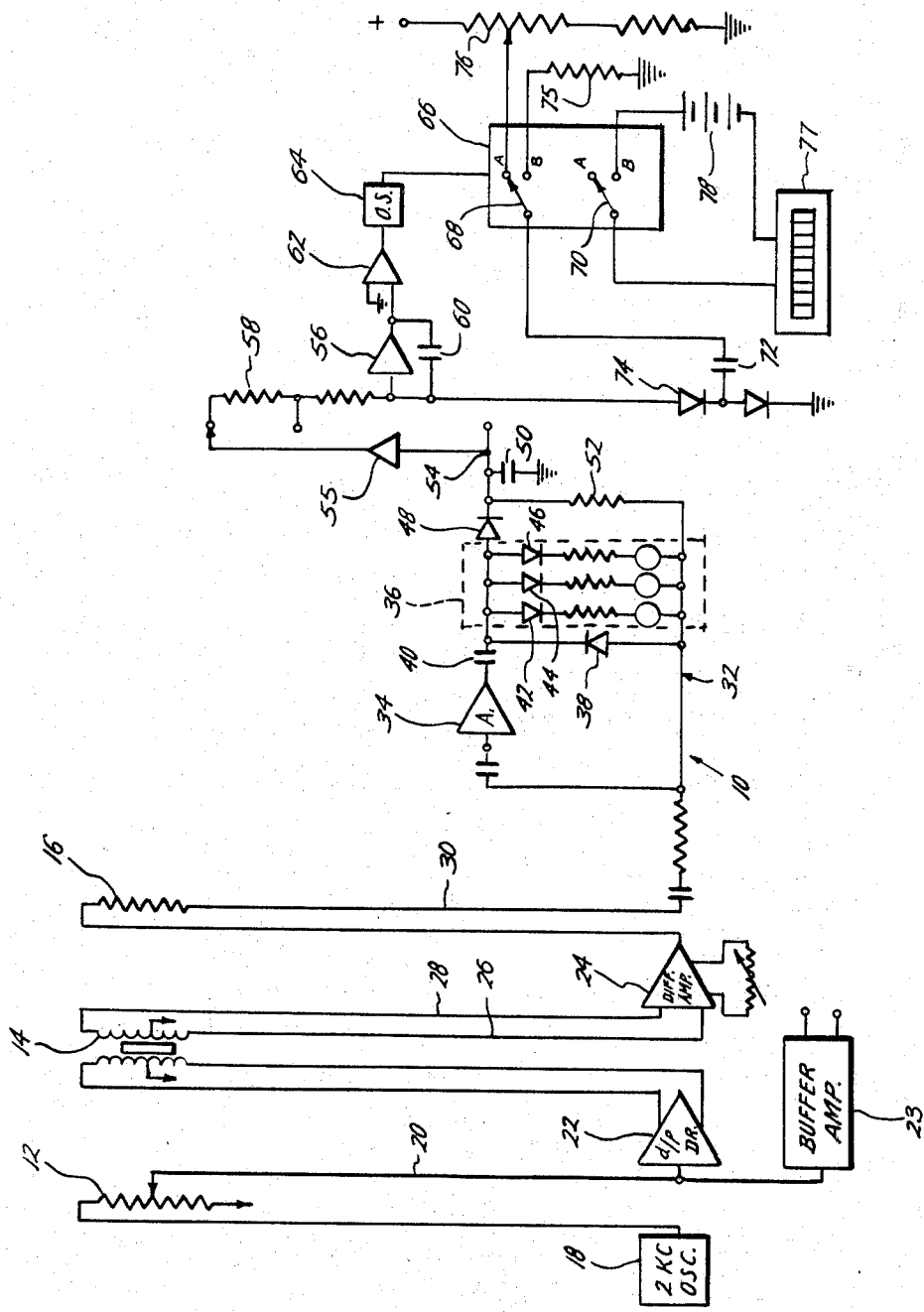

3,407,658
FLOW METER
Odis Doyce Kerbow and Leroy C. Delatorre, Houston, Tex., assignors to Camco, Incorporated, Houston, Tex., a corporation of Texas
Filed Sept. 13, 1966, Ser. No. 579,116
10 Claims. (Cl. 73—205)

ABSTRACT OF THE DISCLOSURE

A flow meter for computing fluid flow from measurements of the flow parameters which operates on A.C. signals without conversion to D.C. signals in the earlier stages providing increased temperature stable performance with low level signals. A flow computer having an A.C. square root extracting circuit in which current is forced through a square root network on the positive cycle and through a first rectifier on the negative cycle whereby the undesirable effects of the forward voltage characteristics of the first rectifier are eliminated and in which a second rectifier is further provided which compensates for the undesirable forward voltage characteristics of diodes in the square root function network. An integrating circuit for converting an input signal to a count rate proportional to the integral of the input signal which includes an integrator, a timing and reset means connected to the integrator and actuated by a predetermined output from the integrator and switching means connected to the timing means for actuation and reset in which a condenser is connected between the integrator input and the switching means for discharging from the integrator upon actuation of the timing and switching means and in which a voltage source is connected to the switching means for charging the condenser with a predetermined charge between reset cycles whereby the integrator will continuously integrate even during its reset cycle and in which a counter is provided connected to switching means counting each time the switching means is reset to provide accumulated count measurement.

---

The present invention relates to a flow meter, and more particularly relates to an electrical apparatus for computing fluid flow from measurements made of the flow parameters and improvements in various of the components.

Generally, it is old to measure fluid flow through an orifice in a pipe by measuring the static pressure in the pipe, the differential pressure across the orifice, and the temperature of the fluid and solving the equation $$F = C\sqrt{\frac{DP}{T}}$$

where $F$=rate of flow, $P$=static pressure, $D$=the drop in pressure across the orifice, $T$=fluid temperature, and $C$ is a constant.

The present invention is directed to a flow meter in which the various components provide an apparatus which gives increased accuracy with a low power consumption.

One object of the present invention is the provision of a flow computer which operates on A.C. signals without conversion to D.C. signals in the earlier stages to provide components which give an increased temperature stable performance with low level signals.

A still further object of the present invention is the provision of a flow meter in which the components are arranged to allow convenient monitoring of the static line pressure without requiring an A.C. to D.C. conversion.

Yet a still further object of the present invention is the provision of an analog flow computer which operates on A.C. signals to monitor and measure the static line pressure, the differential pressure across the orifice and the fluid temperature by A.C. circuitry to provide a temperature stable performance until the flow equation is solved.

Still a further object of the present invention is the provision of an A.C. square root extracting circuit to provide increased accuracy and stability, and in which the circuit is arranged to compensate for the undesirable forward voltage characteristics of the rectifier in the circuit.

Still a further object of the present invention is the provision of an A.C. square root extracting circuit which includes an operational amplifier which receives the A.C. input signal on the summing junction and whose current is then forced through a square root network on the positive cycle and through a first rectifier on the negative cycle whereby the undesirable effects of the forward voltage characteristic of the first rectifier are eliminated, and in which a second rectifier is provided which compensates for the undesirable forward voltage characteristic of the diodes in the square root function network.

A still further object of the present invention is the provision of an improved integrating circuit which continues to integrate while it is being reset.

Yet a still further object of the present invention is the provision of an integrator circuit for converting an input signal to a count rate proportional to the integral of the input signal which includes an integrator, a timing and reset means connected to the integrator and actuated by a predetermined output from the integrator, and switching means connecting to the timing means for actuation and reset in which a condenser is connected between the integrator input and the switching means for discharging from the integrator upon actuation of the timing and switching means, and in which a voltage source is connected to the switching means for charging the condenser with a predetermined charge between reset cycles whereby the integrator will continuously integrate even during its reset cycle, and in which a counter is provided connected to the switching means counting each time the switching means is reset to provide accumulated count measurement.

Other and further objects, features and advantages will be apparent from the following description of a presently preferred embodiment of the invention, given for the purpose of disclosure and taken in conjunction with the accompanying drawing, where like character references designate like parts throughout the several views, and where—

The drawing is an electrical schematic and block diagram illustrating the present invention in use for measuring and indicating the total volume of fluid that passes through an orifice over a period of time.

Referring now to the drawing, the reference numeral 10 generally indicates the flow meter of the present invention which is connected to a conventional static pressure transducer 12 for measuring the static pressure in the pipeline, a differential pressure transducer 14 for measuring the differential pressure drop across the orifice, and a temperature transducer 16 for measuring the temperature of the fluid in the pipe, all of which are conventional and which no further description is believed to be necessary. The transducers may be conventionally connected to the pipeline as shown in copending patent application Ser. No. 458,991, entitled "Flow Meter," now Patent No. 3,376,745.

As previously indicated, it is advantageous to operate a portion of the apparatus 10 on A.C. information without conversion to D.C. to provide increased temperature stable performance. Thus, an oscillator 18 which, for example only, may be a 2 kc. sine wave oscillator having an output of 3 volts peak to peak imposed upon a three volt D.C. level provides an input signal source. The output of the oscillator 18 is preferably applied first to the static line pressure transducer 12 which changes the signal in proportion to the static line pressure. By applying the input signal voltage from the oscillator 18 first to the static line pressure transducer 12, the output 20 from the transducer 12 may be directly monitored by a buffer amplifier 23 so that the line pressure can be conveniently monitored if desired. The buffer amplifier may include a filter and D.C. amplifier in which the filter is used to completely remove the A.C. component of the input signal so that the static pressure can be conveniently monitored without an A.C. to D.C. conversion.

The output 20 from the static pressure transducer 12 is transmitted to differential pressure driver 22 which amplifies the A.C. component of its input signal and converts it to a balanced drive for the primary of the differential pressure transducer 14. Therefore, the resultant secondary voltage of the differential pressure transducer transformer is a relatively low signal level and is proportional to the product of static and differential pressure and provides the product DP of the above mentioned computer equation. The output signal from the differential pressure transducer 14 is transmitted to the input of a differential amplifier 24, by a balanced output lines 26 and 28. The A.C. differential amplifier 24 amplifies the voltage difference between its input while rejecting any voltage from its input to common. Therefore, while noise tends to be induced equally into both lines 26 and 28 and appears equally at the amplifier input and the noise tends to be rejected by the amplifier as a common mode signal.

The output A.C. voltage from the differential amplifier 24 is used to provide an input signal or drive to the temperature transducer 16 whose resistance is proportional to the fluid temperature and therefore the output 30 from the temperature transducer 16 is proportional to $DP/T$. Of course, if the temperature of the fluid being measured does not vary appreciably, the temperature transducer 16 may be omitted.

The output signal in line 30 is an A.C. signal in which it is desired to extract the square root before conversion to a D.C. signal for increased accuracy and stability. Thus the A.C. signal from the output 30 is applied to the input of an A.C. square root extraction circuit 32.

The A.C. input signal to the square root extracting circuit 32 is applied to the input of the A.C. operational amplifier 34 and is transmitted to the square root network 36 which consists of a plurality of diodes, resistances and voltage sources, any number of which may be utilized, and here shown as three for convenience. However, the voltage supplied to the square root network 36 is unidirectional because of the rectifying action of diode 38 which is connected in parallel with the amplifier 34. Thus on the negative cycle condenser 40 charges through diode 38 but since the other diodes 42, 44 and 46 in the square root network 36 are reverse biased when diode 38 is conducting, all of the negative cycle of input signal must pass through diode 38 into condenser 40. This eliminates the effect of the undesirable forward voltage characteristic of rectifier 38 from affecting the signal. At the peak of the positive cycle, diode rectifier 48 conducts and charges condenser 50 to the peak voltage across the square root network 36. At the same time diode 48 switches resistor 52 across the square root network 36 so that the voltage across the network at this time is proportional to the square root of the input. It is at this point in the apparatus 10 that the conversion from an A.C. signal to a D.C. signal is obtained by means diode 48. Furthermore, rectifier 48 does not have an undesirable forward voltage effect on the signal since it is a part of the network and in fact, is actually used to compensate for the undesired forward voltage characteristic of diodes 42, 44 and 46. Therefore, at junction 54 a D.C. voltage signal is provided which is proportional to fluid flow, which can be monitored if desired.

The D.C. flow rate signal output from the junction 54 is then transmitted to a D.C. integrator, by means of buffer amplifier 55, and automatically resets itself after a set input voltage-time product is reached, and each time the integrator resets, a count is registered on a mechanical counter whereby the counter reading is then proportional to the accumulated flow rate. While any suitable integrator may be used, the following described integrator is particularly advantageous and may be used aside from its use with the apparatus 10 herein described as it continues to read during the reset operation and thus is a continuous operating integrator. In the integrator circuit a conventional D.C. integrating operational amplifier 56 is utilized with input resistor 58 and capacitor 60. An amplifier 62 is provided, connected to the output of the integrator 56, which may be a differential amplifier which in turn is connected to and drives a conventional one shot multivibrator 64 whenever the output of amplifier 56 goes negative with respect to ground. The multivibrator 64 in turn drives any suitable switching means such as conventional control switch 66 which moves switches 68 and 70 from position A to position B for a predetermined period of time and then resets the control switch 66 to its original position such that the switches 68 and 70 are returned to contact A. A condenser 72 is provided connected to switch 68 and in turn through diode 74 to the integrator condenser 60. When the switch 68 is in the A position, condenser 72 is charged to a predetermined voltage set by the potentiometer 76. When the switch 68 is in a B position the charged condenser 72 is allowed to completely discharge through the diode 74 from the summing junction of the integrator 56 and thus discharge capacitor 60. In order to operate the integrator 56 linearly while condenser 60 is being discharged through condenser 72, a current limiting means such as resistor 75 is connected to condenser 72 thus limiting current discharge from integrator 56 to prevent overdriving the integrator 56.

Switch 70 is connected to a counter 77 and a power source 78 whereby when switch 70 is moved to the B position the counter 77 is actuated.

Thus, the control switch 66 is initially in position A and capacitor 72 is therefore charged through switch 68 while capacitor 60 is initially discharged and therefore a signal coming into the input of the integrator 56 would charge capacitor 60 and drive the output of the integrator 56 negative thereby actuating the multivibrator 64 causing the switch 66 to be actuated and move switches 68 and 70 to the B position. However, during and after the time that the switches 68 and 70 move from position A to position B the integrator 56 continues to integrate. When the switch is moved to position B the predetermined voltage charge on condenser 72 is discharged from condenser 60 to drive the integrator 56 positive. As the charge from capacitor 60 discharges to capacitor 72 amplifier 62 is not affected and integration continues through the reset period. After a predetermined period of time the multivibrator timing element 64 resets the control switch 66 to the originial A position and the integration of the input signal to the integrator 56 continues and the cycle repeats. Therefore, each time the cycle repeats the counter 77 will be actuated and a set voltage charge from the condenser 72 will be discharged from the integrator 56 which will be an indication of the quantity of the signal being integrated. The scale of the quantity being integrated may be controlled by varying the resistor 76 to vary the charge set in the condenser 72 which is later transmitted from the integrator 56. Therefore, the counter 77 reads the accumulated flow of the apparatus 10 and the integrator circuit is particularly advantageous in that it continues to read even though the control switch 66 is actuated and reset.

In operation, the apparatus 10 is provided with the transducer 12, 14 and 16 conveniently placed in a pipe and an A.C. input signal is provided from the oscillator 18, preferably first to the static pressure transducer 12 so that the output therefrom may be conveniently monitored by buffer amplifier 23. In addition, the output in line 20 from the transducer 12 is transmitted to an A.C. differential pressure amplifier or driver 22 to the differential pressure transducer 14. The output in lines 26 and 28 from the transducer 14 is proportional to the product of line pressure times differential pressure and this is transmitted to the A.C. differential amplifier 24 and transmitted to the temperature transducer 16 which therefore produces an output signal in line 30 proportional to the product of the static pressure times the differential pressure divided by the temperature. The signal from the output 30 is then transmitted to A.C. operational amplifier 34 and is flowed unidirectionally to the square root network 36 and is rectified by the rectifier 48 to provide a D.C. signal at the junction 54 which may be monitored as it is a D.C. voltage proportional to the flow rate. This flow rate signal is then integrated to provide an accumulated flow rate or total flow as measured by the counter 77.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art without departing from the spirit of the invention, and it is desired to protect by Letters Patent all forms of the inventions falling within the scope of the following claims.

What is claimed is:

1. A flow meter for measuring fluid flow through an orifice in a pipe and including means for measuring the static pressure in the pipe, means measuring the differential pressure across the orifice, and means measuring the temperature of the fluid comprising:

an A.C. oscillator connected to and supplying a signal to the static pressure measuring means, an A.C. amplifier having an input and output, the input connected to and receiving the output signal from the static pressure measuring means and the output connected to the differential pressure measuring means, an A.C. differential amplifier having an input and output, the input of which is connected to the output of the differential pressure measuring means, and the output of which is connected to the temperature measuring means, an A.C. operational amplifier having an input and output, the input of which is connected to the output of the temperature measuring means, a square root network receiving the output of the operational amplifier, A.C. to D.C. conversion means, the input of which is connected to the operational amplifier and the square root network, a D.C. amplifier connected to the conversion means and receiving the output from the square root network, the output of which is proportional to fluid flow rate, and integrating means connected to the output of the D.C. amplifier for measuring the accumulated flow rate.

2. The apparatus of claim 1 wherein the integrating means includes:

a D.C. integrator, switching means connected to the output of said integrator, a counter connected to the switching means, a condenser connected between the integrator and the switching means for transferring a charge from the integrator to the condenser upon actuation of the switching means, a voltage source connected to the switching means for connection to and charging of said condenser, and rectifier means between said condenser and said integrator allowing a charge to be transferred from the integrator to the condenser.

3. An integrating circuit comprising;

an integrator having an input and an output, switching means connected to the integrator and actuated by a predetermined output from the integrator, said switching means being reset, after a predetermined period of time, a condenser connected between the integrator input and the switching means for transferring a charge from the integrator to the condenser upon actuation of the switching means, a voltage source connected to the switching means for connection to the condenser when the switching means is reset, a counter connected to the switching means for counting each time the switching means is actuated, and rectifier means between said condenser and said integrator allowing a charge to be transferred from the integrator to the condenser.

4. An integrating circuit comprising;

an integrator having an input and an output, timing and reset means connected to the integrator and actuated by a predetermined output from the integrator, switching means connected to the timing means and actuated and reset by said timing and reset means, a condenser connected between the integrator input and the switching means for discharging the integrator upon actuation of the timing and switching means, a voltage source connected to the switching means for connection to the condenser when the switching means is reset, a counter connected to the switching means for counting each time the switching means is actuated, and rectifier means between said condenser and said integrator allowing a charge to be transferred from the integrator to the condenser.

5. The apparatus of claim 4 wherein the voltage source is variable for varying the quantity counted by the counter.

6. The apparatus of claim 4 including;

current limiting means connected to the switching means for connection to the condenser upon actuation of the timing and switching means for limiting current discharge from the integrator.

7. A flow meter for measuring fluid flow through an orifice in a pipe and including means for measuring the static pressure in the pipe, means for measuring the differential pressure across the orifice, and means for measuring the temperature of the fluid comprising;

an A.C. oscillator connected to and supplying an A.C. signal to the state pressure measurng means, an A.C. amplifier connected to and receiving the output signal from the static pressure measuring means and connected to the differential pressure measuring means, an A.C. differential amplifier connected to the output of the differential pressure measuring means and having its output connected to the temperature measuring means, an A.C. operational amplifier having an input and output, the input of which is connected to the output of the temperature measuring means, a first rectifier connected in parallel with the operational amplifier, a square root network connected in parallel with the operational amplifier, a second rectifier connected to the output of the operational amplifier and the square root network, a condenser connected to the output of the second rectifier, and integrating and counting means connected to the output of the second rectifier for measuring the accumulated flow.

8. An A.C. squareroot extractor circuit for extracting the square root from an input signal comprising;
- an A.C. operational amplifier having an input and output, the input of which receives the input signal,
- a first rectifier connected in parallel with the operational amplifier,
- a square root network connected in parallel with the operational amplifier and the rectifier,
- a second rectifier connected in series with the output of the operational amplifier for converting the output signal of the amplifier to D.C.,
- a load resistor connected to the output of the second rectifier and receiving the output of the square root network whereby the voltage across the resistor will be proportional to the square root of the input, and
- a condenser connected to the output of the second rectifier which is charged to the peak voltage across the network.

9. A flow meter for measuring fluid flow through an orifice in a pipe and including means for measuring the static pressure in the pipe, means for measuring the differential pressure across the orifice, and means for measuring the temperature of the fluid comprising;
- an A.C. oscillator connected to and supplying an A.C. signal to the static pressure measuring means,
- an A.C. amplifier connected to and receiving the output signal from the static pressure measuring means and connected to the differential pressure measuring means,
- an A.C. differential amplifier connected to the output of the differential pressure measuring means and having its output connected to the temperature measuring means,
- an A.C. operational amplifier having an input and output, the input of which is connected to the output of the temperature measuring means,
- a first rectifier connected in parallel with the operational amplifier,
- a square root network connected in parallel with the operational amplifier,
- a second rectifier connected to the output of the operational amplifier and the square root network,
- an integrator having an input and an output,
- timing and reset means connected to the integrator and actuated by a predetermined output from the integrator,
- switching means connected to the timing means and actuated and reset by said switching means,
- a condenser connected between the integrator input and the switching means for discharging the integrator upon actuation of the timing and switching means,
- a voltage source connected to the switching means for connection to the condenser when the switching means is reset,
- a counter connected to the switching means for counting each time the switching means is actuated, and
- rectifier means between said condenser and said integrator allowing discharging of the integrator.

10. A flow meter for measuring fluid flow through an orifice in a pipe and including means for measuring the static pressure in the pipe, and means for measuring the differential pressure across the orifice comprising;
- an A.C. oscillator connected to and supplying an A.C. signal to the static pressure measuring means,
- an A.C. amplifier connected to and receiving the output signal from the static pressure measuring means and connected to the input of the differential pressure measuring means,
- an A.C. differential amplifier connected to the output of the differential pressure measuring means,
- an A.C. operational amplifier having an input and output, the input of which is connected to the output of the A.C. differential amplifier,
- a first rectifier connected in parallel with the operational amplifier,
- a square root network connected in parallel with the operational amplifier,
- a second rectifier connected to the output of the operational amplifier and the square root network.
- a condenser connected to the output of the second rectifier, and
- integrating and counting means connected to the output of the second rectifier for measuring the accumulated flow.

References Cited

UNITED STATES PATENTS 3,096,434  7/1963  King.
3,097,527  7/1963  Davis et al. _____ 73—205

FOREIGN PATENTS 1,418,879  10/1965  France.

RICHARD C. QUEISSER, *Primary Examiner.*

CHARLES A. RUEHL, *Assistant Examiner.*